United States Patent [19]

Brimer

[11] 4,188,552
[45] Feb. 12, 1980

[54] GARAGE DOOR OPENER INCLUDING A LINEAR ACTUATOR

[75] Inventor: Claude M. Brimer, Bryan, Ohio

[73] Assignee: Linear International Corporation, Rancho La Costa, Calif.

[21] Appl. No.: 845,625

[22] Filed: Oct. 26, 1977

[51] Int. Cl.² .......................................... H02K 41/02
[52] U.S. Cl. ..................................................... 310/13
[58] Field of Search .................................. 310/12-19; 49/360

[56] References Cited

U.S. PATENT DOCUMENTS

| | | | |
|---|---|---|---|
| 1,881,014 | 10/1932 | Ayers | 310/13 X |
| 1,916,491 | 7/1933 | Rose | 310/13 |
| 3,374,823 | 3/1968 | Ford | 310/13 X |
| 3,697,838 | 10/1972 | New | 310/13 X |
| 3,852,626 | 12/1974 | Davis | 310/13 |

*Primary Examiner*—Donovan F. Duggan
*Attorney, Agent, or Firm*—Lockwood, Dewey, Alex & Cummings

[57] ABSTRACT

A linear motor is utilized to open and close large doors such as conventional segmented overhead garage doors or large single piece slidable doors. In the linear actuator, the stator, including a two-phase winding mounted thereon, is mounted for operation in a substantially stationary position. A straight elongate channel member is utilized as an armature for the motor, and with overhead garage doors is connected at one end to a door member. With horizontal sliding doors, the armature is mounted along the top edge of the door in spaced relation therewith, except at the opposed ends thereof where it is secured to the door. Energization of the linear motor moves the elongate armature to open or close the door as desired. A fail-safe brake mechanism may be incorporated in the linear motor to lock the armature in position and therefore lock the door when the motor is not energized. The construction of the armature eliminates the periodic adjustments necessary with bicycle chain type drive systems, and the use of inexpensive channel material for the armature provides a less expensive door operator than a rotating screw drive door opener system.

8 Claims, 6 Drawing Figures

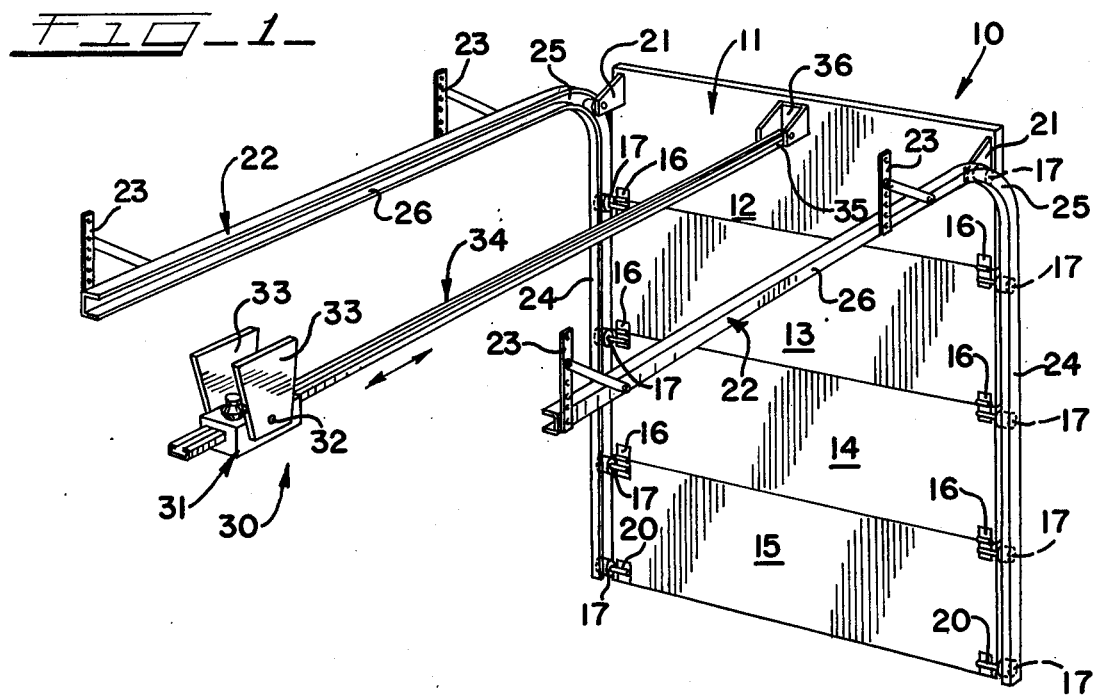
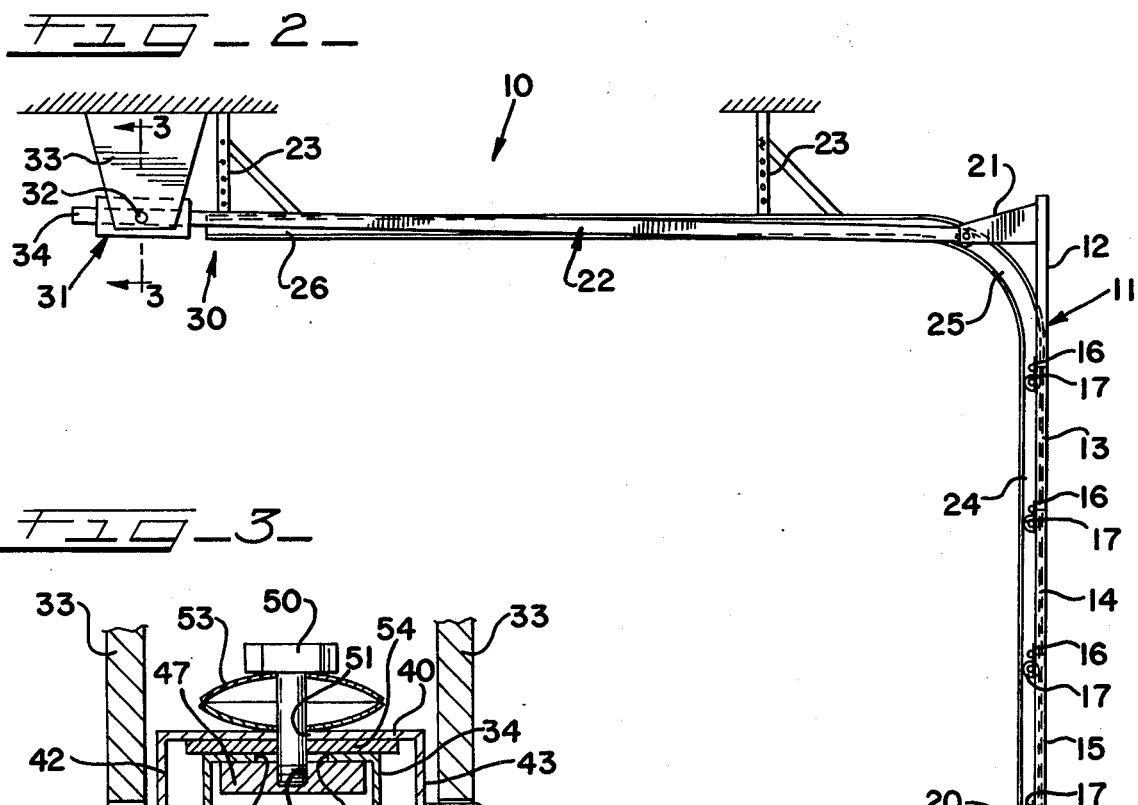
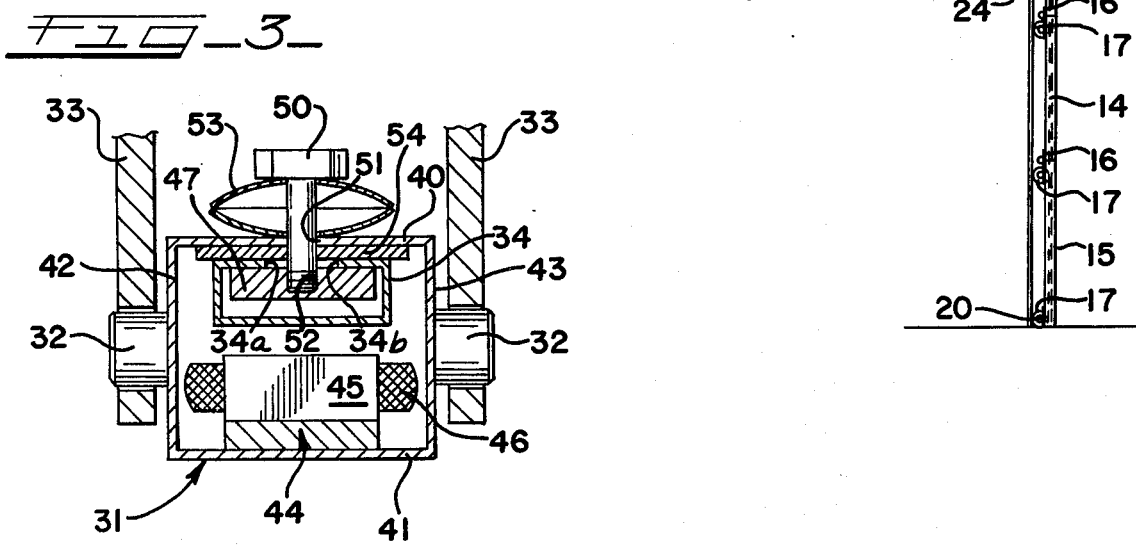

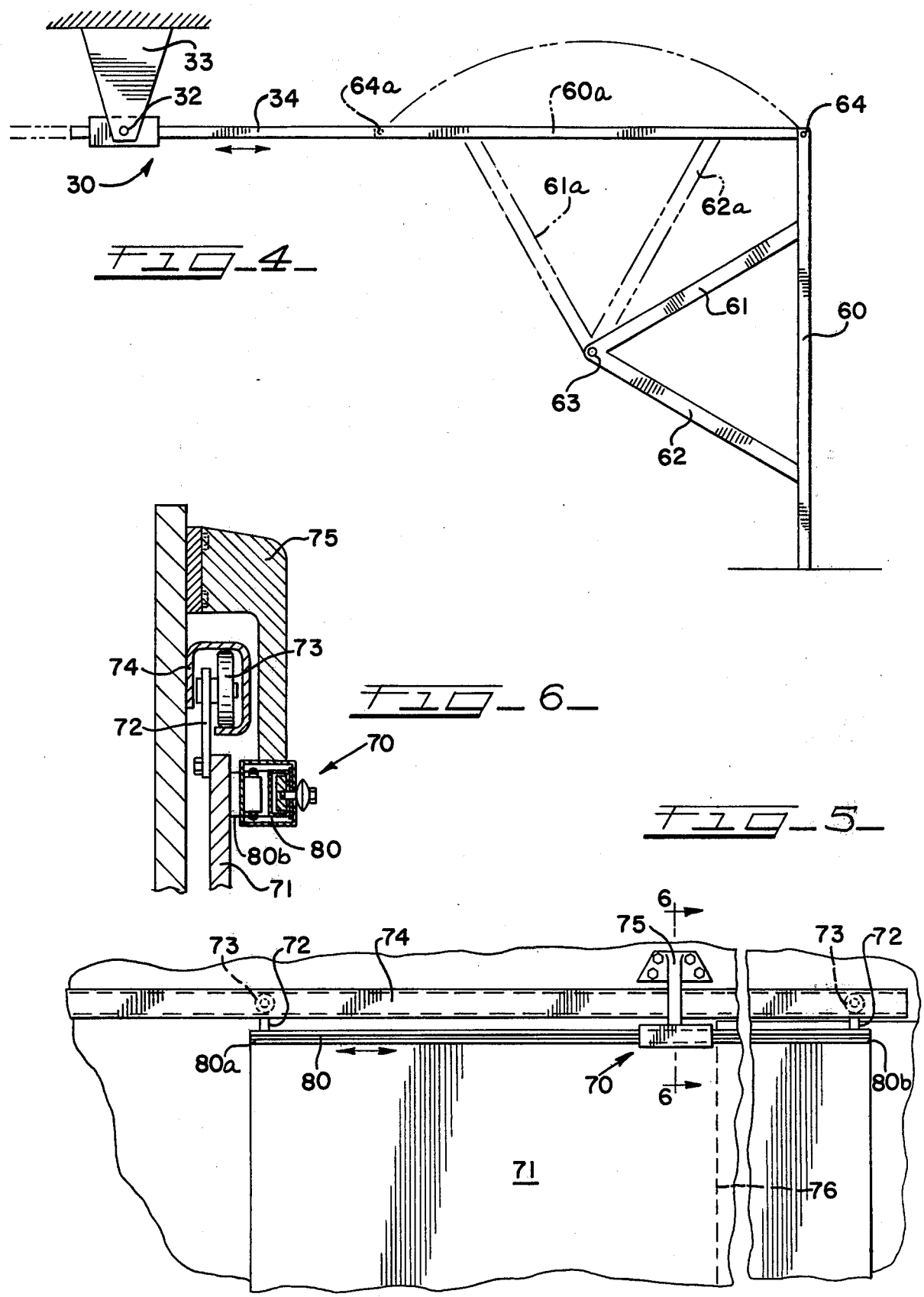

GARAGE DOOR OPENER INCLUDING A LINEAR ACTUATOR

BACKGROUND OF THE INVENTION

This invention relates to an electrical door operator which is adapted for preferred use in buildings or other stationary structures to drive a relatively large door between open and closed positions. More particularly, this invention relates to a door operator incorporating a stationary dual-phase linear induction motor, and wherein the linear movement of the armature of the motor is adapted to control the movement of a door member in a building such as a garage, warehouse, or the like.

Heretofore, electrically powered door openers, and especially those suitable for operation in combination with a segmented overhead garage door, have employed a conventional fractional horsepower motor to drive the door between its open and closed positions. The typical segmented overhead-type garage door employs a plurality of rectangular door segments with each segment hinged to an adjacent segment along a horizontally oriented side thereof. An opposed pair of rollers, one mounted on each short vertical side of an individual door segment, are guided and restrained by opposed rails or channels which are securely mounted adjacent the sides of the door opening. The rails or channel-shape members are mounted in an inverted L-shape position with the horizontal top portions thereof extending inwardly into the garage or other structure, preferably being secured to beams or joists therein.

The conventional door opener utilizes a fractional horsepower motor and drives through a gear train to rotate one or more chain sprockets. In turn, a bicycle-type chain which is driven by the sprockets is attached at one distal end thereof to the door, preferably adjacent the top of the door at its center. Driving the fractional horsepower motor in one direction of rotation tends to open the door, and driving it in the opposite direction tends to close the door. Associated electrical circuitry which usually include limit switches turn off the motor when the door reaches a proper open or closed position. While these limit switches could be positioned to be actuated or de-actuated by the movement of the door itself, typically, they are positioned in the housing of the door opener and are tripped by an intermediate member which is mounted for movement inside the housing. This intermediate member is also driven by the fractional horsepower motor. One disadvantage of such a control arrangement is the continuous stretching of the link chain which is being driven by the sprocket and which is directly connected to the door. As the door is opened and closed, the chain stretches and the alignment of the intermediate member with the limit switches does not compensate for the stretching. Therefore, the conventional door opener needs periodic re-adjustment to operate in a satisfactory manner.

Other types of door openers employ pneumatic or hydraulic actuators, conventional motors with associated reduction gears, friction clutches or other power transmitting mechanisms. These door openers are expensive, complex, and difficult to maintain in precise adjustment.

Some linear motor actuators have been utilized to open and close doors which are moved in a single plane, usually to one side of the door opening adjacent which the door is mounted. U.S. Pat. Nos. 1,986,616; 1,986,639; 2,964,260; and 3,374,823 disclose such door openers. These linear motor actuators have typically required three phase power supplies for their use or having utilized sliding contacts or brushes, thus being expensive and complex.

SUMMARY OF THE INVENTION

It is an object of the present invention, generally stated, to provide an improved garage door operator system.

Another object of the invention is the provision of a linear actuated door operator which is easily adaptible for opening either conventional segmented overhead type garage doors, or one or two piece horizontally sliding garage doors.

A further object of the invention is the provision of a stationary linear motor door operator which utilizes a movable elongate armature to open and close a garage-type door.

The invention is directed to a door operator for driving a garage type door between open and closed positions. The door operator includes a stationary motor mounting having a linear induction motor secured therein. The motor includes a rigid frame and a stator mounted in insulated manner on the frame. The stator includes a pair of windings which are mounted thereon. A flux return member is mounted on the frame in spatial relation to the stator and defines a gap therebetween. An electrical circuit is connected with the pair of windings in order to produce a magnetic flux across the motor gap when the circuit is energized by passing a plural phase alternating current therethrough. The motor further includes an elongate armature which is disposed in the gap and moves traversely therethrough in response to the magnetic flux. The armature includes means adjacent at least one of its ends for the connection of a door member thereto.

BRIEF DESCRIPTION OF THE DRAWINGS

These and other objects of the present invention will be apparent from the following detailed description of currently preferred embodiments thereof, taken in conjunction with the accompanying drawings, wherein:

FIG. 1 is a perspective view of an improved linear actuator garage door opener constructed in accordance with the invention as shown mounted to a typical segmented overhead-type garage door.

FIG. 2 is a side elevational view of the overhead-type garage door shown in FIG. 1 including the linear actuator door opener of the invention.

FIG. 3 is a vertical cross-sectional view through the linear actuator taken along line 3—3 of FIG. 2.

FIG. 4 is a side elevational view of the linear actuator garage door opener shown as mounted to operate a pivotally mounted overhead door of one piece construction.

FIG. 5 is a partial elevational view of the linear actuator door opener as mounted to operate a one-piece door which is hung on rollers from an elongate channel for horizontal movement thereof.

FIG. 6 is an enlarged cross-sectional view taken along line 6—6 of FIG. 5.

DETAILED DESCRIPTION OF THE PREFERRED EMBODIMENTS

Referring to FIGS. 1 and 2, a conventional segmented sliding overhead-type garage door system incorporating the door opener of the present invention is generally indicated at 10. The garage door 11 includes a plurality of rectangular segments 12-15 which are each hingedly connected at 16—16 along the longest edges thereof to the door segment positioned immediately subjacent thereto. In this embodiment, an axially mounted roller 17 extends outwardly of the outside edge of each hinge and is mounted integrally therewith. Additionally, other axially mounted rollers 17—17 are securely rotatably mounted to plates 20—20 on opposing sides of the bottommost door segment 15, and are rotatably mounted on flange plates 21—21 which extend outwardly of the plane of the uppermost door segment 12 adjacent the top edge thereof. The rollers 17—17 are aligned to be moved along opposing inverted L-shape rails 22—22. In a typical installation, the rails 22—22 are securely mounted to the building or structure (not shown) such that the vertical leg portions of the rails are mounted adjacent the sides of a door opening. The upper horizontal arms of the raises 22—22 are typically secured to building roof rafters or the like (not shown) by a plurality of struts or braces 23—23.

In conventional operation, the segmented overhead-type garage door 11 is opened by moving the topmost portion of of the top segment 12 horizontally toward the interior of the building or structure in which the door is mounted. The rollers 17—17 follow the vertical portion 24 of each opposing rail 22 upwardly through the right angle bend 25—25 at the center of each rail and onto the upper horizontal portion 26—26 of each rail thus moving each door segment vertically around the 90°bend, and horizontally inwardly of the building or structure in which the door system is mounted.

The door operator of the present invention is generally indicated at 30, and it includes a linear induction motor, generally indicated at 31. In this embodiment, the linear induction motor 31 is pivotally mounted at 32—32 to stationary mounting supports or brackets 33—33 which are in turn secured to the building joists, beams or the like in a secure manner. Linear motor 31 includes an elongate armature 34 which extends through a gap in the motor 31 and is rotatably mounted at one end 35 thereof to a mounting bracket 36 which is positioned centrally along the top edge of the uppermost segment 12 of garage door 11.

In operation, the embodiment shown in FIGS. 1 and 2 opens door 11 when a magnetic flux field in the linear motor 31 moves armature 34 to the left as shown in FIGS. 1 and 2. The door is closed by reversing the direction of magnetic flux flow to move the armature 34 to the right as shown in FIGS. 1 and 2. Limit switches (not shown) may be mounted on the linear actuator so as to be actuated by detents or indents in armature 34 to turn off the door opener when the door is in a desired position. The sturdy armature 34, in this embodiment a C-shape channel preferably made of aluminum or other non-magnetic conductive material, does not stretch under normal operating conditions as does a bicycle chain which is utilized in conventional garage door openers. Therefore, frequent readjustment of limit switch operation is not necessary in applicant's improved garage door opener. Further, the C-channel material is considerably less expensive than a screw drive shaft utilized with other door openers.

Referring to FIG. 3, the linear induction motor 31 may be constructed in accordance with the linear motor described in my co-pending application Ser. No. 846,888, filed Oct. 31, 1977. This linear induction motor incorporates a generally rectangular hollow elongate frame including opposed top and bottom sides 40, 41 respectively, and opposed sidewalls 42, 43 respectively. An elongate stator 44 made of ferromagnetic material, of which a preferred material is iron, is mounted to the interior surface of the bottom frame wall 41 in a preferred central position thereon. Stator 44 includes a plurality of rectangular slots 45 extending inwardly of the top and side surfaces thereof. A dual set of coil windings 46 (shown as a sketch only) is wound in the slots in stator 44. By connecting the coil windings 46 to an appropriate electric circuit, stator 44 produces a magnetic flux field.

A flux return member 47 which, in this embodiment, is a generally elongate rectangular bar and made of ferromagnetic material, preferably iron, is mounted adjacent the interior surface of the top frame wall 40. In this embodiment, return iron member 47 is mounted for slidable vertical movement in the motor frame. A bolt 50 is slidably retained through an aperture 51 in frame top wall 40 and the distal threaded end of bolt 50 is secured in a threaded aperture 52 in return iron member 47. A spring, in this embodiment a belleville washer 53, is positioned along the stem of bolt 50 between the head thereof and the top frame wall 40.

As shown most clearly in FIG. 3, the C-channel armature 34 is positioned to extend substantially around the return iron 47 while allowing the bolt 50 of the movable mounting for the return iron to pass through the space between the distal wall portions 34a, 34b, respectively, of the armature.

In operation, when the stator windings are energized and a magnetic flux field is created therearound, the return iron 47 is attracted downwardly, narrowing the gap between the return iron and stator 44 while becoming the bias of the belleville washers 53 acting through bolt 50. When the return iron 47 is in its downward position, the elongate armature 34 is free to translate depending upon the direction of force created by the magnetic field. When the magnetic field is broken, i.e., when the motor is turned off, the belleville washer 53 acts through bolt 50 to bias return iron member 47 toward the top wall 40 of the motor frame. This movement sandwiches the distal ends 34a-34b between the return iron member and a friction pad 54 secured to the inner surface of the top wall 40. This sandwiching action creates an effective brake to stop the armature 34 and therefore lock the movement of door 11 in any desired position. The brake is a fail-safe operating mechanism since the linear motor must be actuated to free the armature 34. It should be noted that the linear motor may be operated without utilizing the fail-safe brake mechanism if free movement of the door after de-energization of the motor 31 is considered desirable. A full explanation of the linear motor 31 with the integrally formed fail-safe brake mechanism is described in my co-pending application denoted above.

Referring to FIG. 4, the linear motor actuated door opener 30 is shown in driving connection to a pivotally mounted single piece overhead swinging garage door 60. Door 60 is swung overhead by means of a plurality of braces 61, 62 exatending therefrom which join at pivotal mounting 63 wherein the door is secured to the structure, building, framework, or the like. As in the previous embodiment, armature 34 is pivotally mounted to the top of door 60 at mounting 64. The operation of door opener 30 in connection with the single piece overhead door 60 is substantial similar with the operation of door opener 30 in the first embodiment utilizing the segmented overhead door 11. The pivotal mounting 32 is again utilized for motor frame of the linear actuator. In one variation from the first installation, the pivotal mounting 64 between the armature 34 and the door 60 moves through and art segment between end movement points 64 and 64a, with the path of movement shown in dotted line. The full open position of door 68 is shown in dotted line at 60a with the end position of the respective braces being at 61a and 62a, respectively.

Referring to FIGS. 5 and 6, a third embodiment of the garage door opener of the invention is generally indicated at 70 as it appears when mounted for drivingly operating a single piece horizontally sliding hung door 71. Conventionally, door 71 is suspended by a pair of hangers 72—72, with one such hanger extending vertically from each of the top corners of door 71. Hanger 72 includes an axially mounted roller 73 which is adapted to ride in a substantially horizontally mounted channel or rail 74 which is securely positioned above the door opening 76 and which may extend to one or both sides thereof. In certain installations one door 71 will be of sufficient size to cover the door opening. However, in other installations, two such doors may be utilized side by side with the doors opening in opposed directions in generally a single plane. In such installations two linear motors are utilized. The linear actuated door opener of the present invention is, in this embodiment, rigidly mounted to a depending arm member 75 which is securely fastened to the building or other structure as shown. In this embodiment, the linear motor of the invention is substantially similar in construction to linear motor 31 shown in FIG. 3 with the exception of being mounted with the stator 44 positioned parallel to the door to be opened, and with the motor frame mounted 90° degrees from the position shown in FIG. 3. One other difference in the linear door operator as utilized to swing a door horizontally is the fixed mounting of the armature 80 with respect to the door 71. Whereas in the first two embodiments shown the armature was pivotally mounted to the top center of the door, in this embodiment, the armature 80 is fixedly mounted to the door 71 in the immediate proximity of the respective hangers 72 mounted at each top corner of the door 71.

As shown most clearly in FIG. 6, the armature 80 is positioned in spatial relation to the door 71 in between the respective end mountings 80a, 80b, thereof. However, since the door 71 is supported by hangers 72 and rollers 73 from a channel 74, no substantial vertical thrusts are encountered by the central portion of the armature 34, as the armature is driven by the actuator 31 in a horizontal direction.

While three particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. A door operator of the type utilizing a conventional single-phase power supply for driving a garage door or other large door between open and closed positions in a building or other structure comprising:
   a stationary motor mounting;
   a linear induction motor pivotally secured on said mounting, said motor including
   a rigid frame;
   a stator mounted in insulated manner on said frame and including a pair of conductive windings mounted thereon;
   a flux return member mounted on said frame in spatial relation to said stator and defining a gap therebetween;
   at least a portion of an electric circuit connected with said pair of windings which when energized produces a magnetic flux across said gap; and
   an elongate armature disposed in said gap for moving traversely therethrough in response to said magnetic flux, and said armature including pivotal mounting means adjacent at least one end thereof adapted for connection to a door member.

2. The door opener defined in claim 1 wherein said linear induction motor is rigidly secured in said stationary motor mounting, and said armature connection means includes a pair of rigid mountings, one positioned adjacent each opposing end of said armature.

3. The door operator defined in claim 1 wherein said stator includes a generally rectangular outline having a plurality of parallel slots extending therein from at least one surface thereof and said windings being mounted through said slots.

4. The door operator defined in claim 1 wherein said flux return member has a generally rectangular outline and includes spring biasing means for biasing said member against said frame in a movable position, and
   said magnetic flux causing an attraction between said return member and said stator which overcomes said biasing member.

5. The door operator defined in claim 1 wherein said armature has a generally C-channel cross-section therethrough, the hollow interior of said armature being of sufficient size to slidably retain said return iron therein with at least one of the distal ends of said C-channel cross-section being sandwiched between said flux return member and said frame, and
   means for mounting said flux return member on said frame extending through a space between said opposing distal ends of said armature.

6. The door operator defined in claim 5 wherein said flux return member mounting means include:
   an elongate rod member rigidly secured on said return member;
   an aperture through a wall of said motor frame in which said rod member is slidably retained;
   stop means mounted on the distal end of said rod member; and
   spring means positioned in biasing relation to said rod member between said frame wall and said stop member.

7. The door operator defined in claim 1 wherein the longitudinal axis of said linear motor as secured in said stationary motor mounting is adapted to be mounted generally perpendicular to the plane of any door to be opened thereby when said door is in a closed position.

8. The door operator defined in claim 2 wherein the longitudinal axis of said linear motor as secured in said stationary mounting is adapted to be mounted substantially parallel to the plane of said door to be operated when said door is adapted for translatory motion in substantially one plane.

* * * * *